United States Patent
Ma et al.

(10) Patent No.: US 9,472,212 B2
(45) Date of Patent: Oct. 18, 2016

(54) OPTIMIZED RECORDING CONDITION FOR HEAT-ASSISTED MAGNETIC RECORDING

(71) Applicant: Seagate Technology LLC, Cupertino, CA (US)

(72) Inventors: Minjie Ma, Bloomington, MN (US); Edward Charles Gage, Lakeville, MN (US); Kaizhong Gao, North Oaks, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/624,089

(22) Filed: Feb. 17, 2015

(65) Prior Publication Data

US 2016/0240216 A1    Aug. 18, 2016

(51) Int. Cl.
| | | |
|---|---|---|
| *G11B 11/00* | (2006.01) | |
| *G11B 5/09* | (2006.01) | |
| *G11B 7/1263* | (2012.01) | |
| *G11B 20/12* | (2006.01) | |
| *G11B 5/00* | (2006.01) | |
| *G11B 11/105* | (2006.01) | |
| *G11B 7/126* | (2012.01) | |

(52) U.S. Cl.
CPC .............. *G11B 5/09* (2013.01); *G11B 7/1263* (2013.01); *G11B 20/1217* (2013.01); *G11B 7/126* (2013.01); *G11B 11/10515* (2013.01); *G11B 11/10595* (2013.01); *G11B 2005/0021* (2013.01); *G11B 2020/1232* (2013.01)

(58) Field of Classification Search
USPC ......... 369/13.26, 13.24, 13.25, 13.33, 13.13, 369/13.32, 13.17; 360/59
See application file for complete search history.

(56) References Cited

U.S. PATENT DOCUMENTS

| | | | |
|---|---|---|---|
| 5,513,166 A | 4/1996 | Tokumitsu et al. | |
| 5,982,714 A * | 11/1999 | Koda | 369/13.24 |
| 6,278,667 B1 * | 8/2001 | Belser | 369/13.01 |
| 6,356,515 B1 * | 3/2002 | Kumita et al. | 369/13.26 |
| 6,525,892 B1 | 2/2003 | Dunbar et al. | |
| 7,099,251 B2 * | 8/2006 | Naoi et al. | 369/53.13 |
| 7,990,647 B2 | 8/2011 | Lille | |
| 8,760,779 B2 | 6/2014 | Johns et al. | |
| 8,854,929 B1 | 10/2014 | Champion et al. | |
| 9,099,103 B1 * | 8/2015 | Krichevsky | G11B 11/10595 369/13.26 |
| 9,240,205 B1 * | 1/2016 | Gao | G11B 7/1263 |
| 2005/0030863 A1 * | 2/2005 | Masui | G11B 7/1267 369/47.53 |
| 2006/0117333 A1 * | 6/2006 | Taguchi et al. | 720/659 |
| 2007/0230012 A1 * | 10/2007 | Erden et al. | 360/75 |
| 2011/0205861 A1 * | 8/2011 | Erden et al. | 369/13.27 |
| 2013/0176835 A1 * | 7/2013 | Yamada | G11B 20/10009 369/13.26 |
| 2014/0119164 A1 | 5/2014 | Wilson et al. | |

\* cited by examiner

*Primary Examiner* — Tan X Dinh

(74) *Attorney, Agent, or Firm* — Hollingsworth Davis, LLC

(57) ABSTRACT

An apparatus comprises a controller configured to apply a writing configuration (WC) to a heat-assisted magnetic recording head to write data to a recording medium. The recording medium includes a plurality of sectors. The controller is further configured to determine an optimized WC for each of the plurality of sectors and initiate a write operation to one of the plurality of sectors. The write operation is configured to be performed by the head utilizing the optimized WC for the respective sector.

20 Claims, 7 Drawing Sheets

OPTIMIZED RECORDING CONDITION FOR HEAT-ASSISTED MAGNETIC RECORDING

SUMMARY

An apparatus of the present disclosure comprises a controller configured to apply a writing configuration (WC) to a heat-assisted magnetic recording head to write data to a recording medium. The recording medium includes a plurality of sectors. The controller is further configured to determine an optimized WC for each of the plurality of sectors and initiate a write operation to one of the plurality of sectors. The write operation is configured to be performed by the head utilizing the optimized WC for the respective sector.

A method of the present disclosure comprises determining an optimized writing configuration (WC) for performing a write operation with a heat-assisted magnetic recording head for each of a plurality of sectors of a recording medium.

Another apparatus of the present disclosure comprises a controller configured to apply a writing configuration (WC) to a heat-assisted magnetic recording head to write data to a recording medium. The recording medium includes a plurality of sectors. The controller is further configured to determine an optimized WC for each of the plurality of sectors and initiate a write operation to one of the plurality of sectors. The optimized WC comprises a WC that minimizes a triple track bit error rate for each of the plurality of sectors of the recording medium and the write operation is configured to be performed utilizing the optimized WC for the respective sector.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In heat-assisted magnetic recording (HAMR), also referred to as thermal-assisted magnetic recording (TAMR), heat energy is used in conjunction with magnetic fields applied to a magnetic recording media, e.g., a hard disk, to overcome super-paramagnetic effects that limit the areal data density of traditional magnetic media. In HAMR recording, information bits are recorded on a storage layer at elevated temperatures. The heated area in the storage layer determines the data bit dimension and linear recording density is determined by the magnetic transitions between the data bits.

Figure 1:
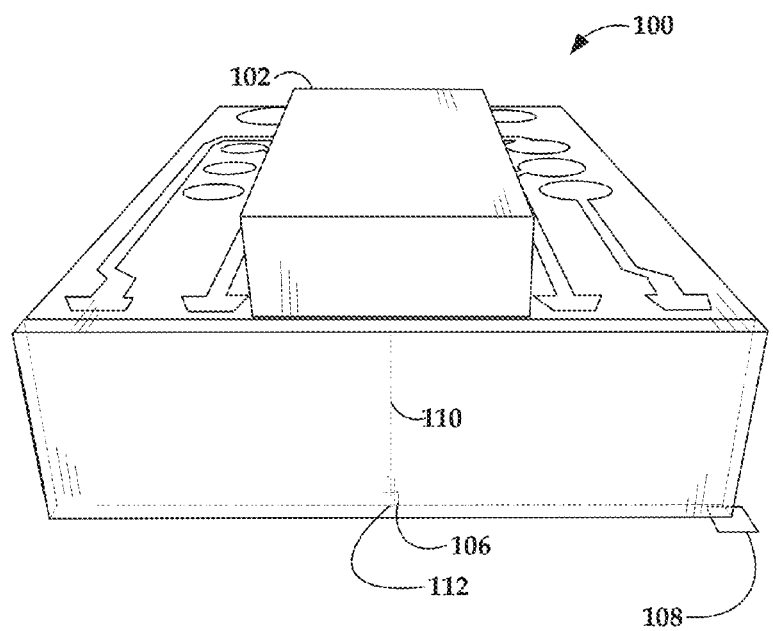
FIG. 1 depicts an example of a HAMR slider.

In order to achieve desired data density, a HAMR recording head, also known as a HAMR slider, includes optical components that direct, concentrate and transform light energy from an energy source to heat on the recording media. An example configuration of a HAMR slider is depicted in FIG. 1. The HAMR slider 100 includes an energy source 102, e.g., a laser diode, configured to produce laser light that energizes an optical antenna 112 of a near field transducer (NFT) 106. The laser light produced by the energy source 102 is guided to the NFT 106 through an optical waveguide 110. The head media interface (HMI), also known as an air bearing surface (ABS) is indicated with item number 108.

Figure 2:
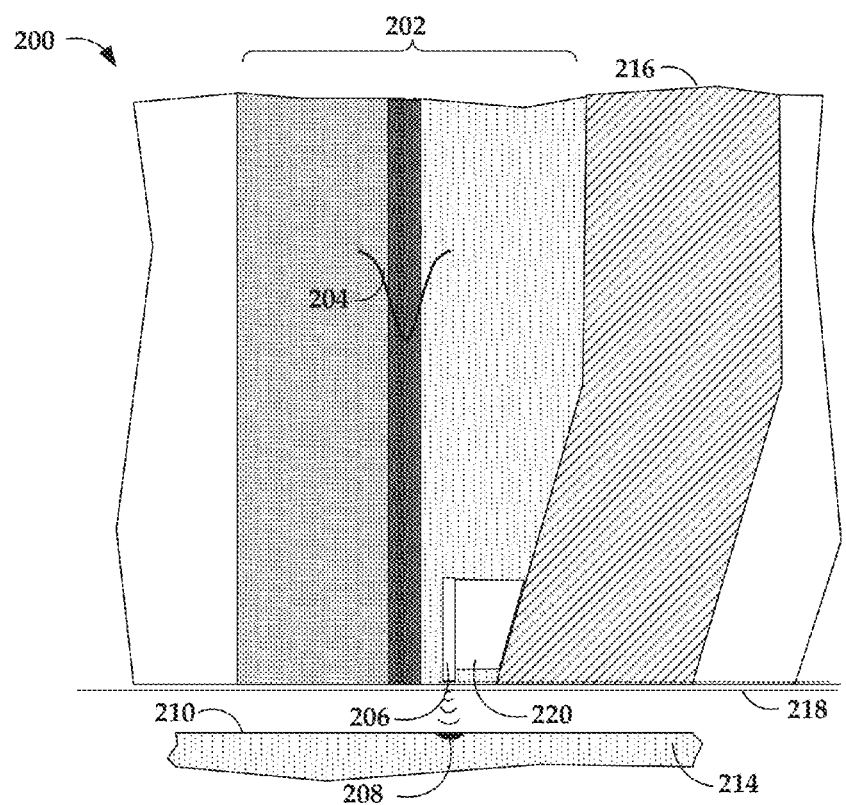
FIG. 2 depicts an example of a read/write head configuration.

In FIG. 2, a block diagram illustrates a cross-sectional view of a slider 200 according to an example embodiment. As shown, a waveguide 202 receives electromagnetic energy 204 from an energy source, the energy being coupled to a near-field transducer (NFT) 206. The NFT 206 is made of a metal (e.g., silver, gold, copper, etc), that achieves surface plasmonic resonance in response to the applied energy 204. The NFT 206 shapes and transmits the energy to create a small hotspot 208 on a surface 210 of a medium 214. A magnetic write pole 216 causes changes in magnetic flux near the media facing surface 218 of the slider in response to an applied current. Flux from the write pole 216 changes a magnetic orientation of the hotspot 208 as it moves past the write pole 216 in the down track (z-direction). The energy 204 applied to the NFT 206 to create the hotspot can cause a significant temperature rise in the local region. As such, the NFT 206 may include a heat sink 220 to draw away some heat, e.g., to the write pole 216 or other nearby heat conductive component.

In HAMR, both magnetic and thermal properties determine the preferred writing configuration (hereafter "WC") (LDI Iop/LDI-OSA/LDI-OSD/Iw/OSA/OSD/heater setting, etc.) to achieve the best performance. Generally, a HAMR drive desirably operates at a WC that produces an acceptable triple track BER. In one configuration, a HAMR laser diode current writing method comprises a track-based laser diode current (TB-LDI) writing method where the whole track is written by a fixed LDI in WC. This writing method assumes a uniform preferred LDI over the track. However, HAMR media may show non-uniformity over a track, which is known as once around (OAR). For media with an OAR issue, the TB-LDI writing method might result in a non-uniform track profile as well as a non-uniform triple track BER. In general, the material distribution of the disk may cause variations within the disk, which can be thermal or magnetic, and, as such, there is a desire to adjust for those variations.

Figure 3A:
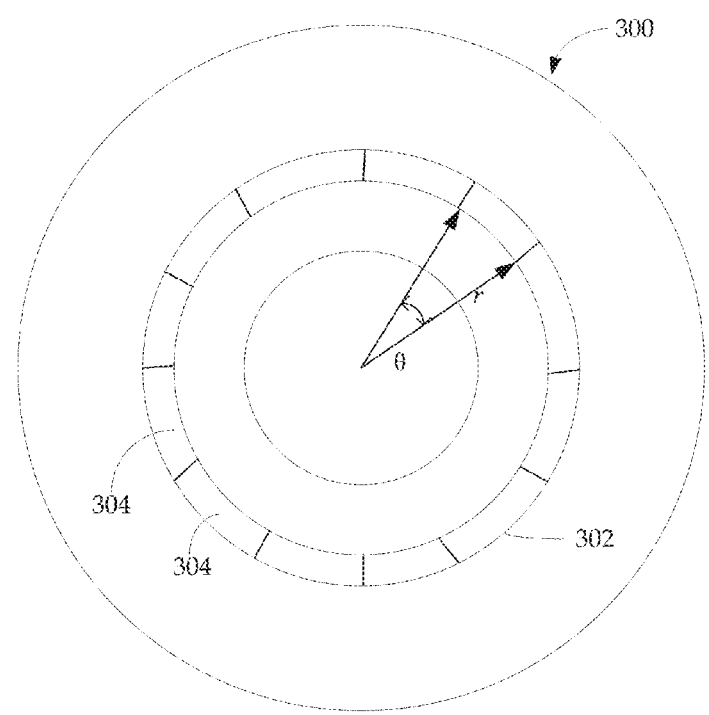
FIG. 3A illustrates an example of a disk with a track and sectors identified
Figure 3B:
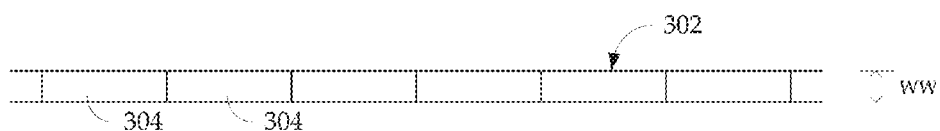
FIG. 3B illustrates an ideal track profile.
Figure 3C:
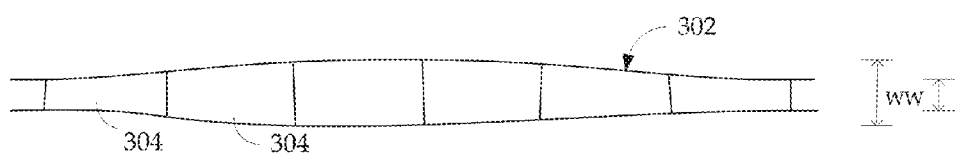
FIG. 3C illustrates an actual track profile.
Figure 4:
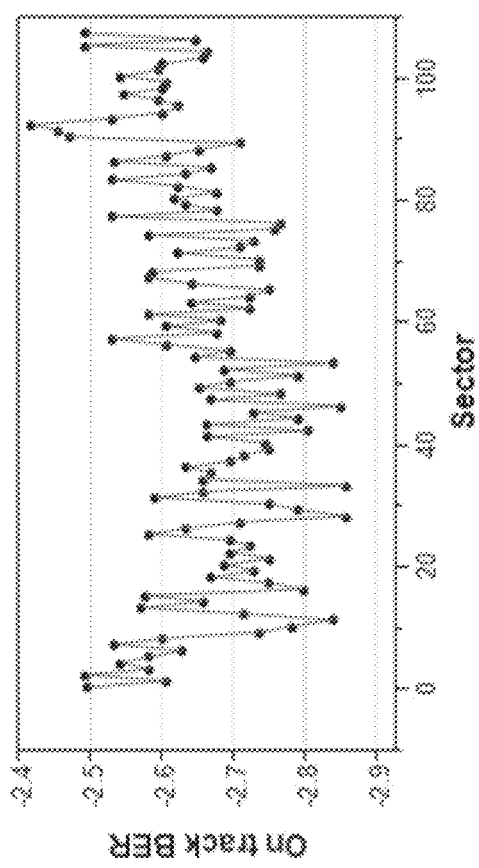
FIG. 4 is a graphical illustration of variation in bit error rate (BER) over sectors of a track.

The variation in track profile may be better understood with reference to FIGS. 3A-3C. FIG. 3A illustrates a simplified magnetic recording medium 300 having a track 302 and a plurality of sectors 304. FIG. 3B represents an ideal track profile for track 302 and sectors 304, with uniform write width (WW), when the TB-LDI writing method is used. FIG. 3C illustrates an actual track profile for track 302 and sectors 304 when the TB-LDI writing method is used. As shown, the WW can vary significantly over a single revolution resulting in a non-uniform triple track BER. FIG. 4 further exemplifies this variation by providing a graphical illustration of the variation in triple track BER over the various sectors of a single track.

Figure 5:
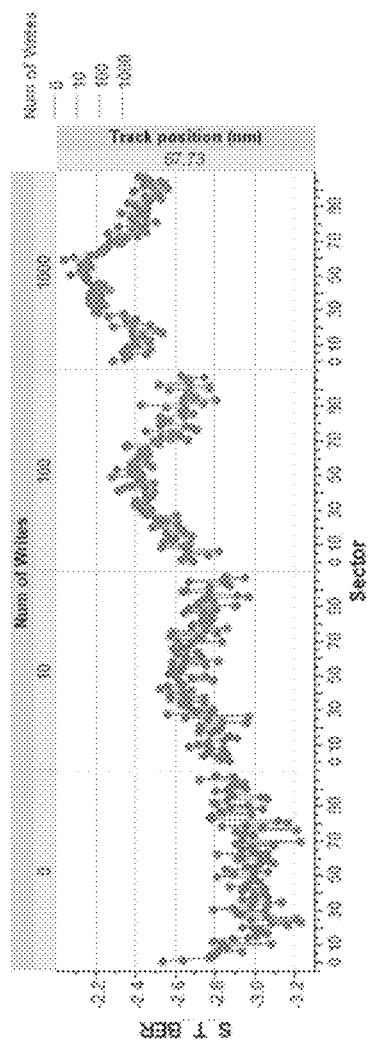
FIG. 5 is a graphical illustration of variation in BER of a neighboring track.

In the TB-LDI writing method, for magnetic media with OAR, sectors on the same track have to compromise BER in order to be operated collectively under the fixed LDI Iop. As a result, the on-track, triple track BER is not at the optimum value. Moreover, the adjacent track influence on BER shows on-track non-uniformity, or OAR, after multiple writes (the adjacent OAR was observed after 10 writes, as shown in FIG. 5). The adjacent track influence on BER can be 0.5 decade worse for sectors which require less $I_{OP}$ than the fixed Iop (see FIG. 5), due to the much wider write width. FIG. 5 is a graphical illustration of the on-track, triple track BER of a neighboring track, after 0 to 1000 writes of a center track, when the magnetic media has an OAR issue.

In order to obtain an optimum triple track BER out of a given media, and to reduce the adjacent track influence OAR effect, the present disclosure describes a sector-based WC (SB-WC) writing method. The method generally includes searching for an optimized WC, determining a preferred optimized WC for each of a plurality of sectors of a recording medium, and adjusting the WC of a HAMR head when the HAMR head writes to the sectors. In SB-WC, one can sweep any WC parameter (hereafter "WCP"), e.g., any parameter that will affect HAMR writing including but not limited to laser diode operation current (LDI Iop), magnetic writing current (Iw), over shoot amplitude of the laser diode current (LDI-OSA), over shoot duration of the laser diode current (LSI-OSD), over shoot amplitude of the magnetic writing current (OSA), over shoot duration of the magnetic writing current (OSD), etc. One may choose to optimize single WCP or multiple WCP, with optimizing one WCP at a time. LDI is one of the most distinct WCPs in HAMR. In the following method 600, the SB-LDI writing is given as an explicit example of SB-WC writing. One can replace the Iop in method 600 with other WCP for the corresponding SB-WC writing.

Figure 6:
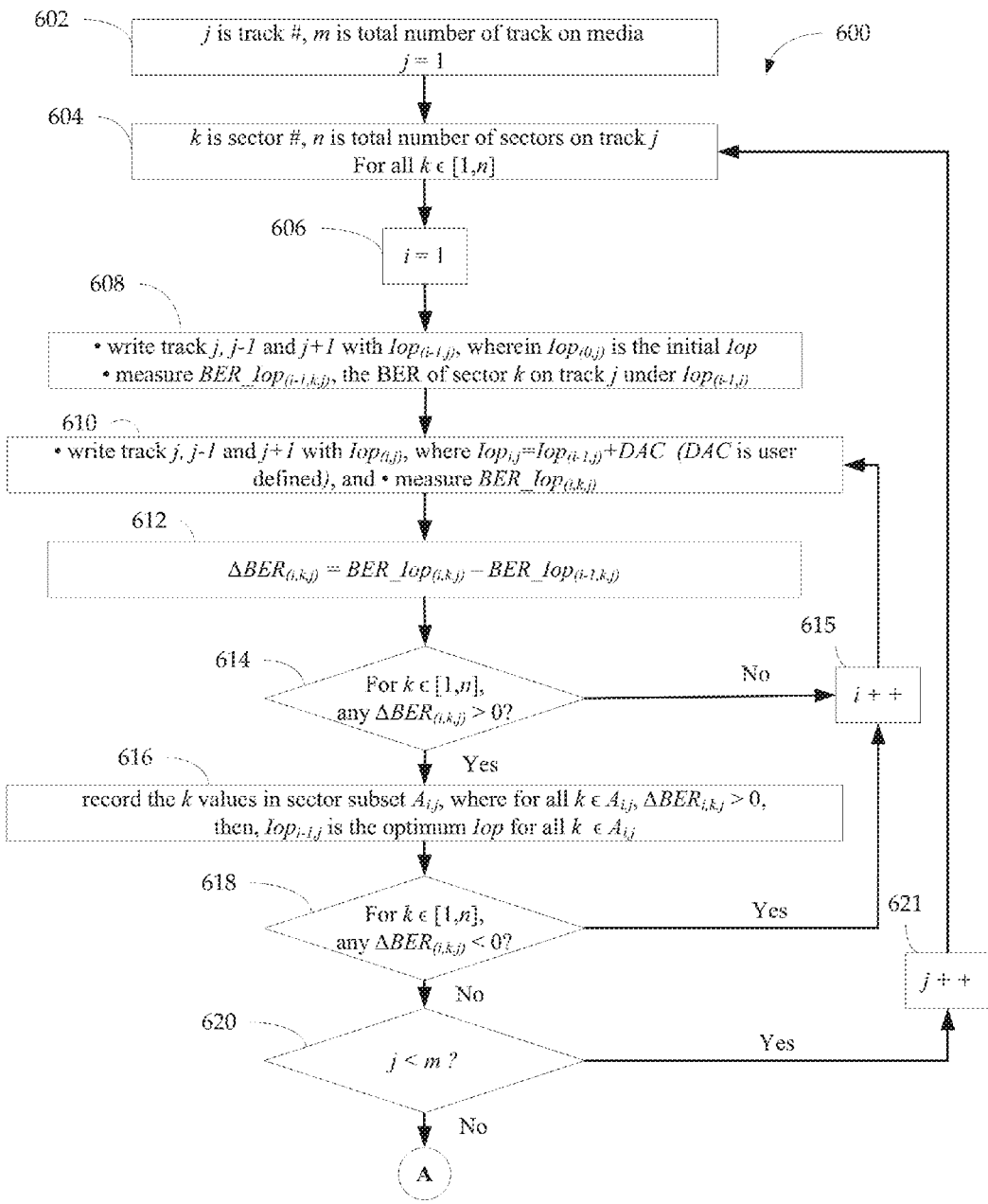
FIGS. 6, 6A and 7 are flowcharts illustrating a sector-based laser diode current (SB-LDI) writing method according to various example embodiments.
Figure 6A:
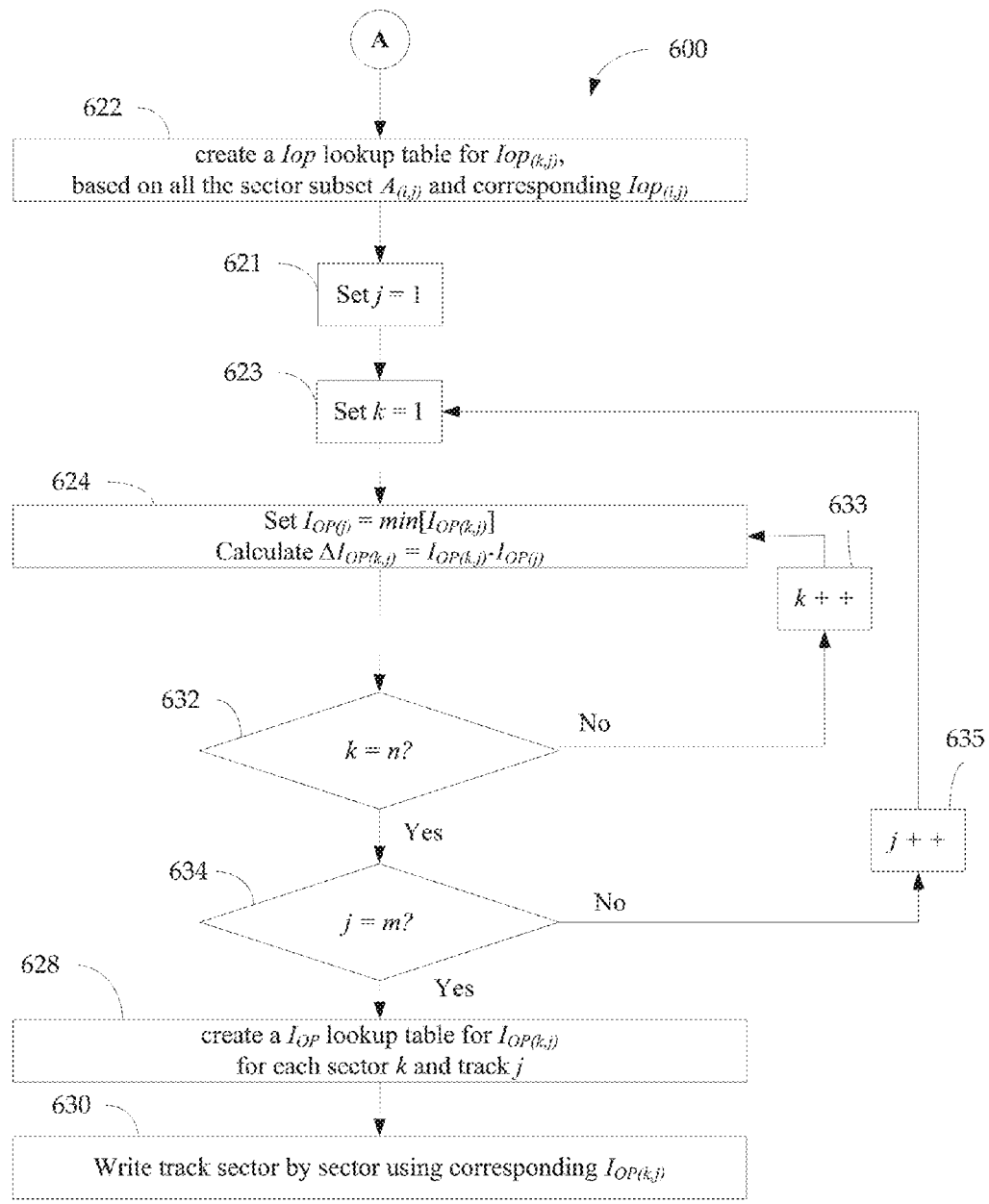

The method 600 is illustrated with reference to the flowchart of FIG. 6. In the SB-LDI writing method 600, for a given media track, each sector of the track is written by a corresponding $I_{OP}$, which enables each sector to produce an optimum triple track BER. The method shown in FIGS. 6 and 6A uses various alphabetic identifiers, which, for reference, include the following: (1) j is the track number, (2) m is the total number of tracks on the media; (3) k is the sector number; (4) n is the total number of sectors on track j; and (5) i is a counter.

Per the method 600, the track number, j, is established as equal to one, 602. Then for all sectors k which comprise an element of the set [1, n], 604, i is set equal to one, 606. Subsequently, each track j, j−1, and j+1 is written with operating current $I_{OP(i-1,j)}$, where $I_{OP(0,j)}$, is the initial operating current $I_{OP}$, and the BER is measured where BER_$I_{OP(i-1,k,j)}$, is the BER of sector k on track j under $I_{OP(i-1,j)}$, 608. It will be appreciated that the sectors selected at block 604 may be a subset of all the sectors of the track, and the tracks selected at block 602 may be a subset of all of the tracks of the media. Then, each track j, j−1, and j+1 is written with operating current $I_{OP(i,j)}$, where $I_{OP(i,j)}$ is equal to $I_{OP(i-1,j)}$+DAC, and DAC is user defined in the same unit as $I_{OP(i,j)}$ (e.g., 0.205 mA for example), and the BER is measured once again as BER_$I_{OP(i,k,j)}$, 610. The difference between the BER values at the operating current and the operating current +DAC is then calculated according to Equation (1), 612:

$$\Delta BER_{(i,k,j)} = BER\_I_{OP(i,k,j)} - BER\_I_{OP(i-1,k,j)} \qquad \text{Eq. (1)}$$

If the difference produces a value for $\Delta BER_{(i,k,j)}$ that is not greater than zero, 614, the counter i is incremented by one, 615, and control of the loop is returned to step 610, where tracks j, j−1, and j+1 are written with the operating current $I_{OP(i,j)}$, reflecting the new value of i and the BER BER_$I_{OP(i,k,j)}$ is once again measured, also reflecting the new value of i. The difference between BER values is once again determined in accordance with Equation (1), 612.

If the difference produces a value for $\Delta BER_{(i,k,j)}$ that is greater than zero, 614, the k values, i.e., the sector numbers, in stored in the sector subset $A_{(i,j)}$, and the corresponding operating current $I_{OP}$ are recorded with the knowledge that for all sector numbers k that are an element of sector subset $A_{(i,j)}$. $\Delta BER_{(i,k,j)} > 0$, the $I_{OP(i-1,j)}$ is the optimum Iop, 616. Subsequently, per decision block, 618, for sector number k comprising an element of set [1, n] it is queried whether any $\Delta BER_{(i,k,j)}$ is less than zero. If any $\Delta BER_{(i,k,j)}$ is less than zero, the counter i is incremented by one, 615, and control is once again returned to step 610 proceeding therefrom as described above.

If no $\Delta BER_{(i,k,j)}$ are less than zero, the method 600 proceeds to decision block 620. At decision block 620, it is queried whether the track number j is less than the total number of tracks m. If the track number j is less than the total number of tracks m, the track number j is incremented by one (or some other value, e.g., 2, 3, 4 . . . ), 621, and control is returned to step 604, to proceed as described above reflecting the new value of j. As such, the method 600 iterates through each sector and track of the media to find the optimum operating current $I_{OP(k,j)}$ for each sector k of each track j, which will also produce the optimum triple track BER. As the method 600 is iterating through the sectors k and tracks j, an operating current lookup table for $I_{OP(k,j)}$, based on all the sector subsets $A_{(i,j)}$I and corresponding Iop may be recorded, 622.

After finding $I_{OP(k,j)}$, the final operating laser current Iop for a sector k of track j can be calculated. First, the counters for sectors k and tracks j are set back to one (621, 623). Then, for all the sectors k of all tracks j, for track j∈[1, m](m being the total number of tracks), $I_{OP(j)}$ is set equal to the minimum [$I_{OP(k,j)}$] and $\Delta I_{OP(k,j)}$ is calculated according to Equation (2), 624:

$$\Delta I_{OP(k,j)} = I_{OP(k,j)} - I_{OP(j)} \qquad \text{Eq. (2)}$$

As the method 600 is iterating through the sectors k and tracks j (using decision blocks 632, 634 and increments 633, 635, respectively), the corresponding operating current $I_{OP(j)}$ and $\Delta I_{OP(k,j)}$ may be recorded in a lookup table, 628. This procedure up to block 628 may be performed during a manufacturing stage of the storage device, e.g., qualification testing. Thus, when writing to the media, each track of the media may be written sector by sector using the corresponding $I_{OP(k,j)} = I_{OP(j)} + \Delta I_{OP(k,j)}$, 630 obtained from the lookup table. Note that the operating current, $I_{OP}$ is utilized in combination with the writing current Iw as ($I_{OP}$/Iw) to present the preferred writing configuration current to the HAMR recording head to achieve the optimal performance from head.

In another example embodiment of the SB-LDI writing method, the method utilizes an angle and radius to determine the optimum operating current for writing to the media. Referring back to FIG. 3A, it can be seen that each track corresponds to a radius r, and each sector corresponds to an angle θ. The flowchart of FIGS. 6 and 6A may be utilized with this embodiment by substituting radius r for track number j and substituting angle θ for sector number k, with other modifications as appropriate. With the noted substitutions, the final operating laser current for a sector defined by angle θ of a track defined by r, can be found in Equation 3:

$$I_{OP_{(\theta,r)}} = I_{OP_{(r)}} + \Delta I_{OP(\theta,r)} \qquad \text{Eq. (3)}$$

The term $\Delta_{OP_{(\theta,r)}}$ is defined by Equation 4 below:

$$\Delta I_{OP(\theta,r)} = \Sigma_k A_{(k,\theta,r)} (\sin \theta)^k \qquad \text{Eq. (4)}$$

Where: $A_{(k,\theta,r)}$ is the coefficient for order k

It should be noted that the operating current lookup tables described above may be implemented through storage in appropriate memory, for example, nonvolatile memory, or may additionally/alternatively be written to the media in especially reserved fields. It should also be noted that calculation of the optimum operating currents may include factors to accommodate for variations in the operating conditions of the disk drive, for example, temperature compensation factors. Moreover, additional optimization may be provided to reduce memory allocation, such as use zone based, wedge based or sector based values for Iop and Iw.

Figure 7:
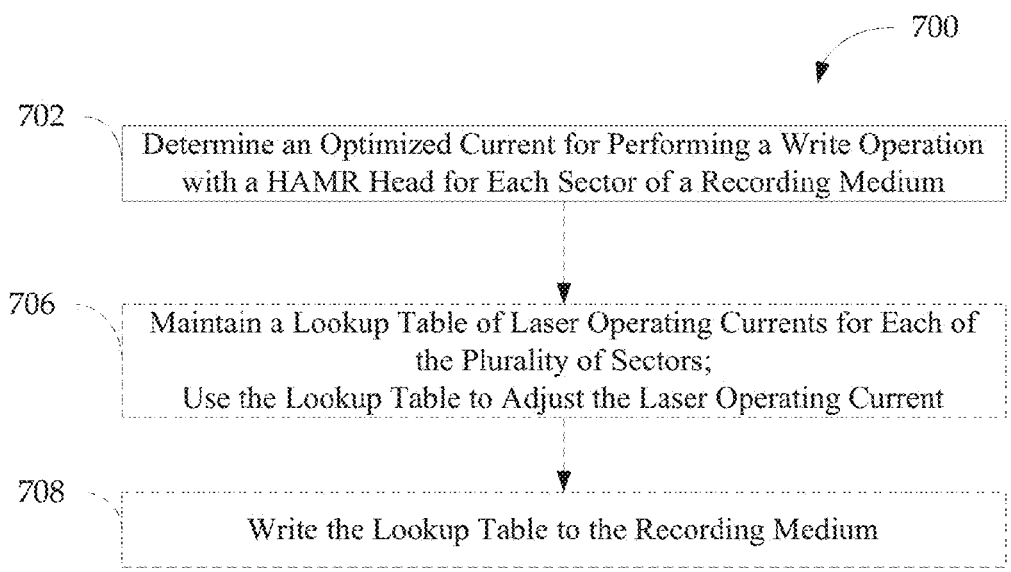

FIG. 7 illustrates a simplified flowchart of the SB-WC writing method of the present disclosure. The method 700 includes: (1) determining an optimized WC for performing a write operation with a HAMR head for each of a plurality of sectors of a recording medium, 702. The method 700 may additionally include maintaining a lookup table of single WCP or multiple WCPs for each of the plurality of sectors 706, using the lookup table to adjust the WC 706, and/or writing the lookup table to the recording medium 708. Other steps may be incorporated as appropriate to a specific application. 708 look up table can be on media or on memory. $1^{st}$ step, Search for optimized WC for each sector (region) within a polarity of sectors.

Figure 8:
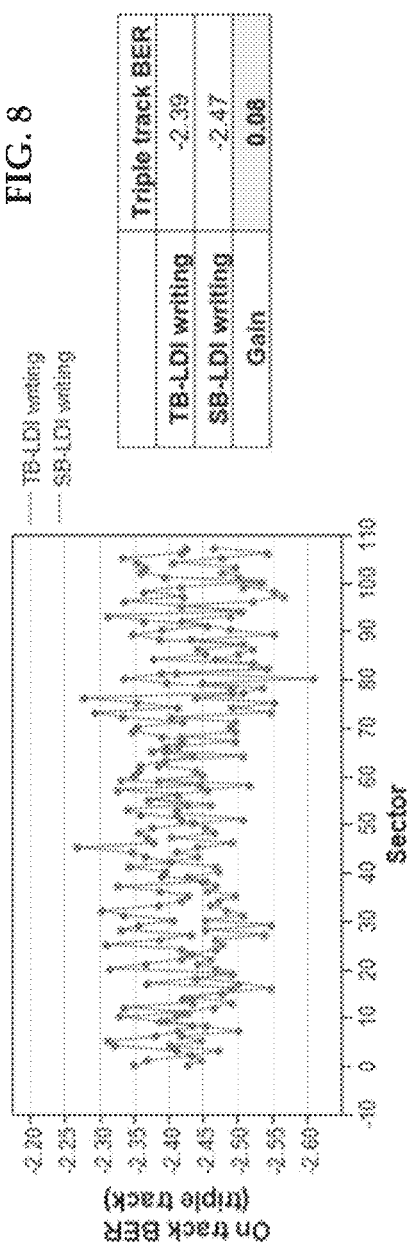
FIGS. 8-9 are graphical illustrations comparing track-based laser diode current (TB-LDI) writing with SB-LDI writing.
Figure 9:
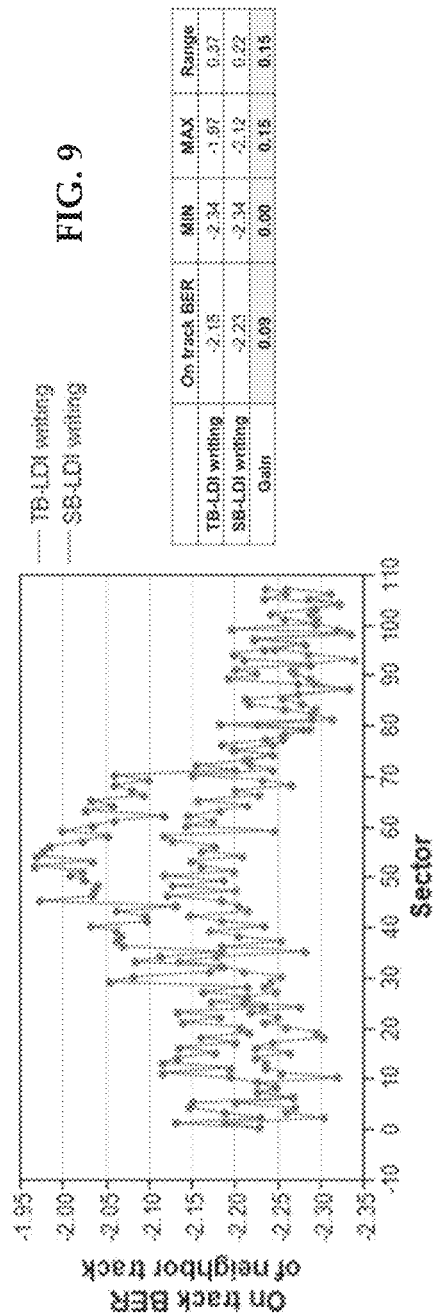

FIGS. 8 and 9 illustrate some of the benefits of using the SB-LDI writing method disclosed herein. Specifically, FIG. 8 provides a comparison of the on-track, triple track BER in relation the track-based LDI writing method and the sector-based LDI writing method. As shown, the sector-based LDI writing method obtained an optimum sector BER, an optimum on-track BER, and thus an optimum area density capability (ADC). FIG. 9 provides a comparison of the on-track, triple track BER of a neighbor track after 1000 writes of the center track using both the track-based (TB-LDI) writing method and the sector-based (SB-LDI) writing method. As shown, the SB-LDI writing method significantly reduced the adjacent track influence once around (ATI OAR) effect which results in reducing the overall adjacent track influence effect.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus comprising:
   a controller configured to apply a writing configuration (WC) to a heat-assisted magnetic recording head to write data to a recording medium comprising a plurality of tracks, wherein each track comprises a plurality of sectors, and wherein the controller is configured to:
   determine an optimized WC for each of the plurality of sectors based on comparison of a calculated difference between bit error rates for each sector to a threshold, wherein a first bit error rate is measured after writing to each of the plurality of sectors using a first WC and a second bit error rate is measured after writing to each of the plurality of sectors using a second WC; and
   initiate a write operation to the plurality of sectors, wherein the write operation is configured to be performed by the head utilizing the optimized WC for each of the sectors.

2. The apparatus of claim 1, wherein the optimized WC comprises a plurality of writing configuration parameters (WCPs) that minimize a triple track bit error rate for each of the plurality of sectors of the recording medium.

3. The apparatus of claim 1, wherein the optimized WC comprises a single WCP that minimizes a triple track bit error rate for each of the plurality of sectors of the recording medium.

4. The apparatus of claim 1, wherein the controller is configured to store a lookup table of the optimized WCs for each of the plurality of sectors.

5. The apparatus of claim 4, wherein the lookup table is indexed via angle parameters and radius parameters corresponding to each of the plurality of sectors.

6. The apparatus of claim 1, wherein each of the sectors comprises a servo wedge-based sector or a data-based sector.

7. The apparatus of claim 1, wherein material properties of one or more sectors of a track varies and wherein the optimized WC is responsive to the variation of the material properties.

8. A method comprising:
   determining an optimized writing configuration (WC) for performing a write operation with a heat-assisted magnetic recording head for each of a plurality of sectors of a recording medium based on comparison of a calculated difference between bit error rates for each sector to a threshold, wherein a first bit error rate is measured after writing to each of the plurality of sectors using a first WC and a second bit error rate is measured after writing to each of the plurality of sectors using a second WC, wherein the recoding medium comprises a plurality of tracks and each track comprises a plurality of sectors.

9. The method of claim 8, wherein the optimized WC comprises an optimized laser diode current (LDI).

10. The method of claim 9, wherein the optimized LDI comprises a LDI that minimizes a triple track bit error rate for each of the plurality of sectors of the recording medium.

11. The method of claim 8, further comprising storing the optimized WCs for each of the plurality of sectors in a lookup table.

12. The method of claim 11, wherein the lookup table is indexed via angle parameters and radius parameters corresponding to each of the plurality of sectors.

13. The method of claim 8, wherein each of the sectors comprises a servo wedge-based sector or a data-based sector.

14. The method of claim 8, wherein material properties of one or more sectors of a track varies and wherein the optimized WC is responsive to the variation of the material properties.

15. An apparatus comprising:
a controller configured to apply a writing configuration (WC) to a heat-assisted magnetic recording head to write data to a recording medium comprising a plurality of tracks, wherein each track comprises a plurality of sectors, and wherein the controller is configured to:
determine an optimized WC for each of the plurality of sectors based on comparison of a calculated difference between bit error rates for each sector to a threshold, wherein a first bit error rate is measured after writing to each of the plurality of sectors using a first WC and a second bit error rate is measured after writing to each of the plurality of sectors using a second WC, and wherein the optimized WC comprises a WC that minimizes a triple track bit error rate for each of the plurality of sectors of the recording medium; and
initiate a write operation to the plurality of sectors, wherein the write operation is configured to be performed utilizing the optimized WC for each of the sectors.

16. The apparatus of claim 15, wherein the optimized WC comprises an optimized laser diode current (LDI).

17. The apparatus of claim 15, wherein the controller is configured to store a lookup table of the optimized WCs for each of the plurality of sectors.

18. The apparatus of claim 17, wherein the lookup table is indexed via angle parameters and radius parameters corresponding to each of the plurality of sectors.

19. The apparatus of claim 15, wherein each of the sectors comprises a servo wedge-based sector or a data-based sector.

20. The apparatus of claim 15, wherein material properties of one or more sectors of a track varies and wherein the optimized WC is responsive to the variation of the material properties.

* * * * *